United States Patent
Menich

(10) Patent No.: US 8,015,135 B2
(45) Date of Patent: Sep. 6, 2011

(54) SYSTEM AND METHOD FOR KNOWLEDGE STORAGE IN AN AUTONOMIC NETWORK

(75) Inventor: Barry J. Menich, South Barrington, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 919 days.

(21) Appl. No.: 11/923,305

(22) Filed: Oct. 24, 2007

(65) Prior Publication Data

US 2009/0112788 A1    Apr. 30, 2009

(51) Int. Cl.
*G06F 17/00* (2006.01)
*G06N 5/00* (2006.01)

(52) U.S. Cl. ........ 706/45; 706/46; 706/47; 706/48; 706/60; 709/223; 709/224; 709/225; 709/226

(58) Field of Classification Search ........ None
See application file for complete search history.

(56) References Cited

U.S. PATENT DOCUMENTS

| | | | |
|---|---|---|---|
| 2004/0158455 A1* | 8/2004 | Spivack et al. | 704/9 |
| 2006/0075013 A1* | 4/2006 | Hite et al. | 709/201 |
| 2006/0142001 A1* | 6/2006 | Moisan et al. | 455/428 |
| 2007/0038500 A1* | 2/2007 | Hammitt et al. | 705/9 |
| 2007/0083607 A1* | 4/2007 | Thompson et al. | 709/217 |
| 2008/0071714 A1* | 3/2008 | Menich et al. | 706/45 |
| 2008/0082380 A1* | 4/2008 | Stephenson | 705/7 |
| 2008/0086490 A1* | 4/2008 | Paliwal et al. | 707/101 |
| 2008/0168420 A1* | 7/2008 | Sabbouh | 717/104 |

FOREIGN PATENT DOCUMENTS

WO    W00115042 A2    3/2001

* cited by examiner

*Primary Examiner* — Omar Fernandez Rivas

(57) ABSTRACT

An indication of an occurrence of an event is received. A first ontology (124) is accessed and selected information associated with the occurrence of the event is obtained from the first ontology (124). A second ontology (122) is then accessed and at least one first rule associated with the occurrence of the event is obtained from the second ontology (122) by using at least in part the selected information from the first ontology (124).

17 Claims, 3 Drawing Sheets

SYSTEM AND METHOD FOR KNOWLEDGE STORAGE IN AN AUTONOMIC NETWORK

FIELD OF THE INVENTION

The field of the invention relates to autonomic networks and, more specifically, to knowledge acquisition within these networks.

BACKGROUND OF THE INVENTION

Autonomic computing systems are typically designed to mimic the human body's central nervous system. For instance, inputs are received by the system and the system reacts to these inputs without the need for specific inputs or control from a human user. In one example, low-level tasks of the system may be performed without the requirement of intervening highly trained human specialists. Autonomic systems may be self-configurable and self-managed, further reducing or eliminating the need for user input and/or control.

Autonomic systems typically include heterogeneous computing elements that are programmed using specific data and commands. For instance, each device in the autonomic system may be programmed using one or more distinct programming approaches (e.g., using the Simple Network Management Protocol (SNMP) or a Command Line Interface (CLI)), according to different programming models (e.g., modal and non-modal approaches) or according to different programming languages.

Autonomic systems and the elements within these systems typically require access to knowledge in the form of rules that facilitate such activities and operations as reasoning and generation of code for data cleaning operations (e.g., filtering the construction of derived attributes, or special or temporal constraints on attribute location). In addition to the conditional selection of rules, system elements sometimes require the specification of different types of processing approaches to be used at the various elements under different conditions, for example, when the selected rules are similar.

Previous autonomic systems have not organized information based according to rules. Rules sometimes were utilized to refine queries, for example, but were not organized for easy retrieval and use. Unfortunately, with previous systems, it proved difficult or impossible to easily obtain the rules for use by various system elements thereby reducing efficiency, accuracy, and system speed.

BRIEF DESCRIPTION OF THE DRAWINGS

The above needs are at least partially met through provision of a system and method for knowledge storage in an autonomic network described in the following description, particularly when studied in conjunction with the drawings, wherein.

Figure 1:
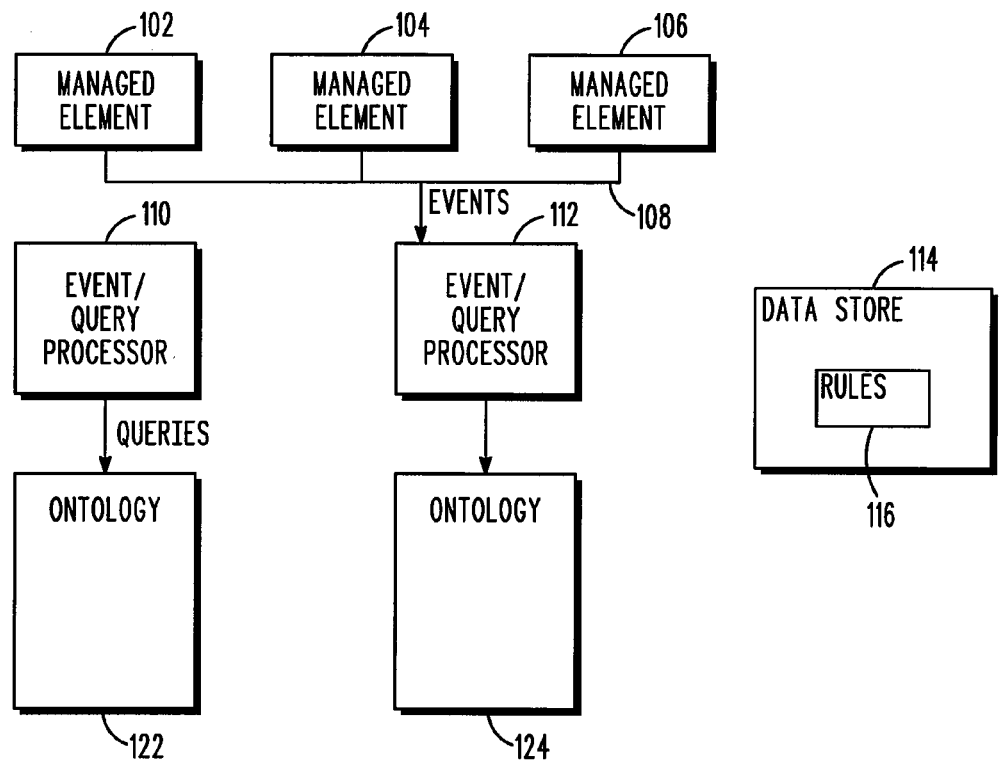
FIG. 1 is block diagram of a system for knowledge storage in an autonomic network according to various embodiments the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method are provided that identify rules that are applicable to and can be used in various types of applications (e.g., data cleaning, attribute construction, or abductive reasoning applications). The rules may be used in these applications for various purposes such as to process disparate types of events and can also be used to determine the cause or causes of these events. Using the present approaches, rules are quickly and easily identified for use in various applications thereby allowing the applications and the system to operate more efficiently and more quickly.

In many of these embodiments, an indication of an occurrence of an event is received. A first ontology is accessed and selected information associated with the occurrence of the event is obtained from the first ontology. A second ontology is then accessed and at least one first rule associated with the occurrence of the event is obtained from the second ontology by using at least in part the selected information from the first ontology.

The event may represent any number of circumstances, occurrences, or conditions. For example, the event may be the indication of an alarm, an indication of an equipment failure, or an indication of a transmission problem. Other examples of events are possible.

In others of these embodiments, the first rule is applied to the event and a characteristic associated with the event is responsively determined. The characteristic associated with the event may take a variety of forms. For example, the characteristic may be the source of an equipment failure, the source of a communication problem, or the source of an equipment problem. The selected information obtained from the first ontology may take many different forms and in one example comprises at least one instance of an ontological class.

In others of these embodiments, at least one second rule that is based upon an application of the first rule is formed. The second rule is then added to one or more of the first ontology and the second ontology. Thereafter, the second rule can be applied to subsequent events and/or other rules can be formed based upon the second rule.

The rules used in these approaches may take many forms and follow a variety of formats and protocols. In one example, the first rule comprises at least one Simple Network Management Protocol (SNMP)-compatible command. Other examples of rule configurations are possible.

Thus, approaches are provided that identify rules that are used in various applications. The rules may be used in these applications for various purposes such as to process disparate types of events and for use in the determination of the cause or causes of these events. Using the present approaches, rules are quickly and easily identified for use in various applications thereby allowing the applications and the system to operate with more efficiency and speed.

Referring now to FIG. 1, a system includes a first managed element 102, a second managed element 104, and a third managed element 106 in this illustrative example. The managed elements are communicatively coupled to a first event/query processor 112. The first event/query processor 112 is coupled to a second event/query processor 110. The first event/query processor 112 is also coupled to a first ontology 124 and the second event/query processor 110 is coupled to a second ontology 122. The first event/query processor 112 and the second event/query processor 110 are additionally coupled to a data store 114. The data store 114 may be any type of data storage device or combination of devices and includes rules 116.

The managed elements 102, 104, and 106 may be any type of device, system, or resource. The managed elements 102, 104, and 106 may also be any combination of hardware and software elements in any type of computer-based processing system. In one example, the managed elements 102, 104, and 106 may be telecommunication system elements such as base stations, repeaters, or access points.

The first ontology 124 and the second ontology 122 provide structures (e.g., organized data structures) that organize information. In this regard, the first ontology and the second ontology may provide rules defining the organizational structure of data. In one example, an ontology is organized as a tree-like data structure with the top leaves of the tree being classes of objects and the bottom leaves of the tree being instances of the classes. In this example, branches may define constraints or facets applied to the classes. The classes themselves may also have attributes. Further, the ontologies 122 and 124 may be constructed of any suitable computer language such as OWL.

The rules 116 map received conditions into actions. For example, received conditions (e.g., alarm conditions) may be mapped into an action (e.g., obtain data). The rules 116 used in these approaches may take many forms and follow a variety of formats and protocols. In one example, the first rule comprises at least one Simple Network Management Protocol (SNMP)-compatible command.

In one example of the operation of the system of FIG. 1, unsolicited events relating to alarm indications are received at the event/query processor 112 from the managed elements 102, 104, and 106, which operate in a packet-based telecommunications system. The events may take a number of forms and in one example are SNMP (Simple Network Management Protocol) "traps." In another example, the managed elements 102, 104, and 106 may signal the event/query processor 112 to indicate some malfunctioning or suboptimal state in a proprietary way. Additional data may be provided along with the event in order to provide context for the event. This additional data may have come packaged along with the event/alarm indication from the device, or the additional data may be obtained from an internal storage device of the event processing system. The additional data may represent previous states of the system, previous states of devices within the system, or the additional data may represent some combination of this information.

The event is received by the event/query processor 112 of the processing system and is analyzed by using the event and additional data as a query "tag" that is provided in order to access the first ontology 124. The first ontology 124 may be constructed according to any suitable computer language such as OWL. The event/query processor 112 uses the event/alarm and the context data to construct complex queries in the OWL language and submits these queries to the first ontology 124. In one example, the event/query processor 112 may be a Protégé Java Application Programming Interface (API).

The results to the query can be possible additional data acquired from one or more of the managed elements 102, 104, or 106 that is needed to define context or provide additional abductive input. In another example, the results of the query may be data that is used to help refine queries and reasoning against the second ontology 122.

With respect to the possible additional data, the query output may be in the form of SNMP "get" commands or device query language of a proprietary nature. The possible additional data is solicited from one or more of the managed elements 102, 104, or 106 and is received by the event/query processor 112. The event/query processor 112 then forwards this information to the second event/query processor 110. The second event/query processor 110 uses the received information to help construct queries into the second ontology 122 for the purposes of obtaining rules for processing all of the data in both solicited and unsolicited responses from the one or more managed network elements 102, 104, or 106.

As mentioned, the query language for the OWL ontology may used to construct queries into the ontologies. The language may facilitate obtaining classes that match context for a particular alarm with context data, or the language may be in the form of complex queries using a "reasoning engine" that retrieves data under particular constraints. The language used could also be in the form of complex queries that return unions or intersections under conditions where more than one managed element 102, 104, or 106 is implicated in an event/alarm scenario. The end result is a set of rules is formed and this is used to populate the working memory of a rule-based expert system. The output of the rule-based expert system may be cleaned or filtered data, or abductive-root cause output.

In other approaches the efficacy of the rule output is also determined. One way of determining the efficacy of the rule output is to have a human assign a grade to the rule derived by the current invention based on the ability of the rule to diagnose a particular situation. Another approach is to use a machine-learning technique whereby successive instances of the application of a rule are measured to determine its efficacy.

In either instance, the event/query processor 110 may use the attributes from the query against the second ontology 122 to create a new class in the appropriate part of the class structure and store the compound rules. Upon future occurrences of encountering the particular event/alarm with its context, the entire process may be short-circuited and the appropriate rules fetched from the second ontology 122 without the need to invoke the rule-determination services of the processors 110 and 112 or any other reasoning engine.

The rules obtained from the second ontology 122 may relate to a specific set of circumstances or conditions. In another example, the event/query processor 112 is used to access the first ontology 124 in order to provide multiple inputs for the second ontology that broaden the set of rules obtained. In other examples, a reasoning engine is used in the second ontology to provide a larger set of executable rules for consideration. In yet another embodiment, new rules are stored in the second ontology.

Figure 2:
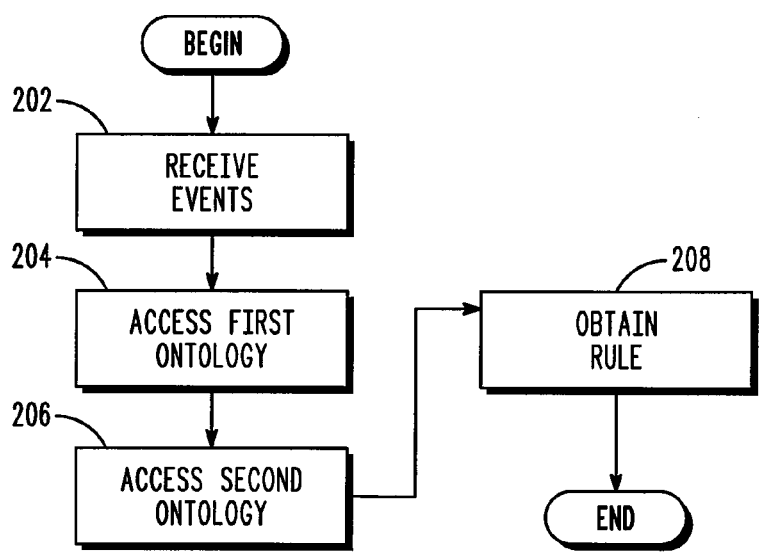
FIG. 2 comprises a flowchart of an approach for knowledge storage in an autonomic network according to various embodiments of the present invention.

Referring now to FIG. 2, one example of an approach for knowledge storage and usage in an autonomic network is described. At step 202, events are received. The events may be, for example, an indication of alarms, an indication of equipment failures, or the indication of transmission problems.

At step 204, a first ontology is accessed and selected information associated with the occurrence of the event is obtained from the first ontology. At step 206, a second ontology is accessed and at step 208 at least one rule associated with the occurrence of the event is obtained from the second ontology by using at least in part the selected information from the first ontology.

Figure 3:
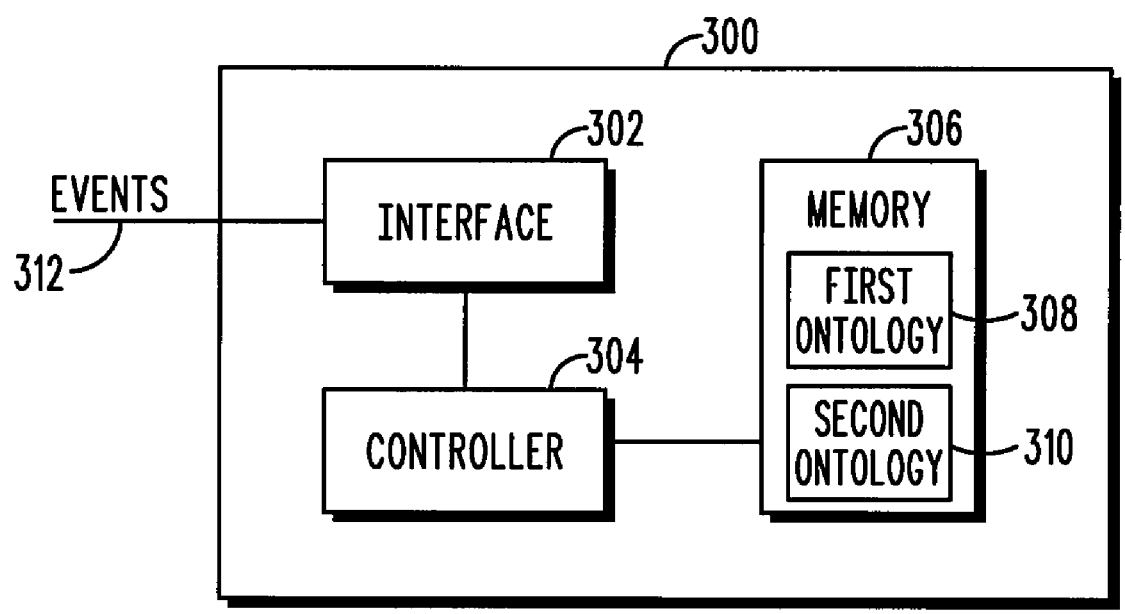
FIG. 3 comprises a flow diagram showing informational and control flow in a system for knowledge storage in an autonomic network according to various embodiments of the present invention.

Referring now to FIG. 3, one example of a device to manage information in an ontological network is described. The device includes an interface 302, a controller 304, and a memory 306 that are operably coupled as shown. The memory 306 is adapted and configured to store a first ontology 308 and a second ontology 310.

The controller 304 is programmed to receive an indication of an occurrence of an event 312 at the input of the interface 302 and to access the first ontology 308 and retrieve selected information associated with the event from the first ontology 308. The controller 302 is further programmed to access the second ontology 310 and obtain at least one first rule associated with the event 312 from the second ontology 310 using at least in part the selected information.

Figure 4:
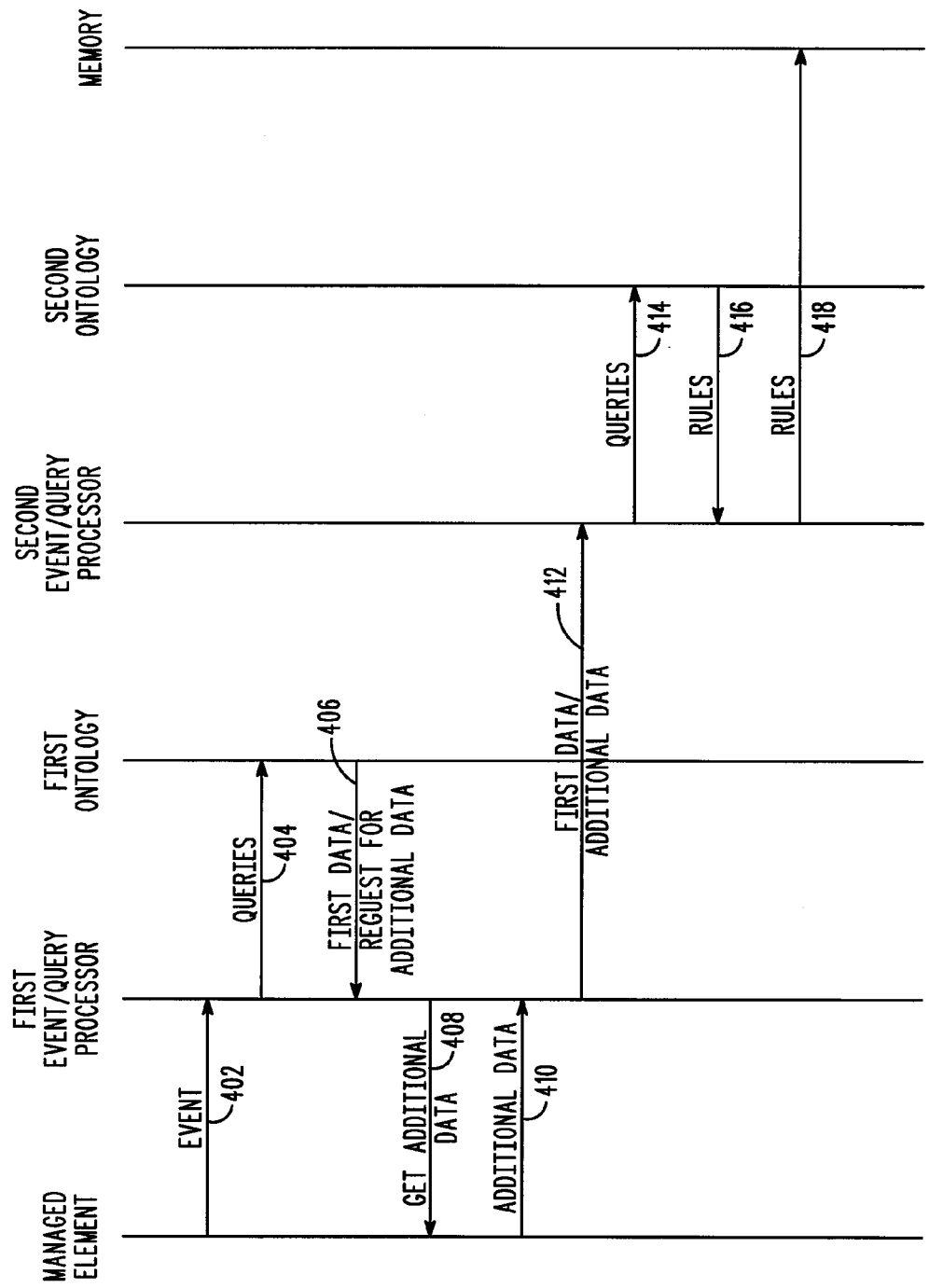
FIG. 4 comprises a flow diagram showing informational and control flow in a system for knowledge storage in an autonomic network according to various embodiments of the present invention.

Referring now to FIG. 4, an approach for knowledge storage in an autonomic network is described. In this example, an event processing system is described that uses a first ontology to inform a second ontology about rules required for processing the event. Use of event/query processors and query techniques are used to search the first ontology to obtain information for use in processing information in the second ontology using identical, or different, reasoning and querying. This system is described for event processing for telecommunications systems, but it can be appreciated that the approaches described can be extensible to other event management applications.

At step 402, an event is received at a first event/query processor. For example, the event may be an indication of an alarm, an indication of an equipment failure, or an indication of a transmission problem. Queries are formed and, at step 404, the queries are sent to access a first ontology. At step 406, first data or a request for additional data is sent from the first ontology to the first event/query processor. At step 408, the first event/query processor sends a request to obtain additional data to the managed element.

At step 410, additional data is sent from the managed element to the first event/query processor. At step 412, the first event/query processor sends the first data and/or the additional data to the second event/query processor. At step 414, the second event/query processor issues queries to the second ontology. At step 416, the second ontology returns rules to the second event/query processor. At step 418, these rules are sent from the second event/query processor to a memory for storage and/or future use by the system.

Thus, approaches are provided that identify rules that are used in various applications (e.g., data cleaning, attribute construction, or abductive instruction formation applications). The rules may be used in these applications for various purposes such as to process disparate types of events and for use in the determination of the cause or causes of these events. Using the present approaches, rules are quickly and easily identified for use in various applications thereby allowing the applications and the system to operate with more efficiency and speed.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method of obtaining rule-based information in an ontological system comprising:
   receiving an indication of an occurrence of an event from at least one managed element; wherein the event indicates a change in state of the at least one managed element;
   accessing a first ontology and obtaining selected information associated with the occurrence of the event from the first ontology;
   accessing a second ontology and obtaining at least one first rule associated with the occurrence of the event from the second ontology by using at least in part the selected information from the first ontology; and
   applying the at least one first rule and responsively determining a cause of the event.

2. The method of claim 1 wherein the event is selected from a group comprising: an indication of an alarm; an indication of an equipment failure; and an indication of a transmission problem.

3. The method of claim 1 wherein the cause of the event is selected from a group comprising: a source of an equipment failure; a source of a communication problem; and a source of an equipment problem.

4. The method of claim 1 wherein the selected information obtained from the first ontology comprises at least one instance of an ontological class.

5. The method of claim 1 further comprising forming at least one second rule based upon an application of the at least one first rule and adding the at least one second rule to at least one of the first ontology and the second ontology.

6. The method of claim 1 wherein the at least one first rule comprises at least one Simple Network Management Protocol (SNMP)-compatible command.

7. A method of obtaining rule-based information in an ontological system comprising:
   receiving an indication of an occurrence of an event from at least one managed element; wherein the event indicates a change in state of the at least one managed element;
   accessing a first ontology and determining selected information associated with the occurrence of the event;
   informing a second ontology of the selected information obtained from the first ontology and responsively obtaining at least one first rule associated with the event from the second ontology by using at least in part the selected information from the first ontology; and
   applying the at least one first rule and responsively determining a cause of the event.

8. The method of claim 7 wherein the event is selected from a group comprising: an indication of an alarm; an indication of an equipment failure; and an indication of a transmission problem.

9. The method of claim 7 wherein the cause of the event is selected from a group comprising a source of an equipment failure; a source of a communication problem; and a source of an equipment problem.

10. The method of claim 7 further comprising forming at least one second rule based upon an application of the at least one first rule and adding the at least one second rule to at least one of the first ontology and the second ontology.

11. The method of claim 7 wherein the at least one first rule comprises at least one Simple Network Management Protocol (SNMP)-compatible command.

12. A device comprising:
an interface having an input and an output;
a memory adapted and configured to store a first ontology and a second ontology; and
a controller coupled to the interface and the memory, the controller being programmed to receive an indication of an occurrence of an event from at least one managed element; wherein the event indicates a change in state of the at least one managed element at the input of the interface and to access the first ontology and retrieve selected information associated with the event from the first ontology, the controller being further programmed to access the second ontology and obtain at least one first rule associated with the event from the second ontology using at least in part the selected information and applying the at least one first rule and responsively determining a cause of the event.

13. The device of claim 12 wherein the event is selected from a group comprising: an indication of an alarm; an indication of an equipment failure; and an indication of a transmission problem.

14. The device of claim 12 wherein the cause of the event is selected from a group comprising a source of an equipment failure; a source of a communication problem; and a source of an equipment problem.

15. The device of claim 12 wherein the controller is further programmed to present the characteristic at the output of the interface to a user.

16. The device of claim 12 wherein the controller is further programmed to form at least one second rule based upon an application of the at least one first rule and store the at least one second rule in at least one of the first ontology and the second ontology.

17. The device of claim 12 wherein the at least one first rule comprises at least one Simple Network Management Protocol (SNMP)-compatible command.

* * * * *

UNITED STATES PATENT AND TRADEMARK OFFICE
CERTIFICATE OF CORRECTION

| | | |
|---|---|---|
| PATENT NO. | : 8,015,135 B2 | Page 1 of 1 |
| APPLICATION NO. | : 11/923305 | |
| DATED | : September 6, 2011 | |
| INVENTOR(S) | : Menich | |

It is certified that error appears in the above-identified patent and that said Letters Patent is hereby corrected as shown below:

On the Title Page, Item (56), under "FOREIGN PATENT DOCUMENTS", Line 1, delete "W00115042" and insert -- WO200115042 --, therefor.

In Fig. 4, Sheet 3 of 3, for Tag "406", in Line 2, delete "REGUEST" and insert -- REQUEST --, therefor.

In Column 1, Line 54, delete "is block" and insert -- is a block --, therefor.

Signed and Sealed this
Eleventh Day of December, 2012

David J. Kappos
*Director of the United States Patent and Trademark Office*